(12) United States Patent
Seamon et al.

(10) Patent No.: US 6,435,555 B1
(45) Date of Patent: Aug. 20, 2002

(54) COLLAPSIBLE STEERING COLUMN AND METHOD

(75) Inventors: Carl Thomas Seamon, Montrose; Melvin L. Tinnin, Cuo, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/781,540

(22) Filed: Feb. 8, 2001

Related U.S. Application Data (60) Provisional application No. 60/181,660, filed on Feb. 10, 2000.

(51) Int. Cl.[7] .................................................. B62D 1/11
(52) U.S. Cl. ......................... 280/777; 280/775; 74/492; 74/493
(58) Field of Search ................................ 280/775, 777; 74/492, 493

(56) References Cited

U.S. PATENT DOCUMENTS

| | | | | |
|---|---|---|---|---|
| 4,786,076 A | * | 11/1988 | Wierschem | 188/376 |
| 5,511,823 A | * | 4/1996 | Yamaguchi et al. | 188/371 |
| 5,580,314 A | * | 12/1996 | Moriyama et al. | 280/777 |
| 5,704,641 A | * | 1/1998 | Shimizu et al. | 188/371 |
| 5,788,278 A | * | 8/1998 | Thomas et al. | 280/777 |
| 6,019,391 A | * | 2/2000 | Stuedemann et al. | 280/775 |
| 6,099,036 A | * | 8/2000 | Fujiu et al. | 280/777 |

\* cited by examiner

*Primary Examiner*—Paul N. Dickson
*Assistant Examiner*—Ruth Ilan
(74) *Attorney, Agent, or Firm*—Edmund P. Anderson (57) ABSTRACT

The collapsible vehicle steering column has a jacket slideably supported by a jacket support bracket and by at least one severable steering column support capsule. A steering wheel is journaled in a housing on the upper end of the jacket assembly. A bearing is supported by the jacket support bracket. A collapsible upper shaft is connected to the steering wheel and is slideably supported by the bearing. A collapsible intermediate shaft is connected to the upper shaft by a universal joint. Force on the steering wheel initially severs the support capsule from the jacket assembly, moves the upper steering shaft and the jacket rearward collapsing the intermediate shaft. After a stop surface on the upper shaft contacts the bearing, the upper shaft starts to collapse and the jacket housing envelopes the universal joint.

13 Claims, 7 Drawing Sheets

COLLAPSIBLE STEERING COLUMN AND METHOD

CROSS-REFERENCE TO RELATED APPLICATIONS

This application is based upon, and claims the benefit of, U.S. Provisional Patent Application No. 60/181,660 filed Feb. 10, 2000, the disclosure of which is incorporated by reference herein in its entirety.

TECHNICAL FIELD

The collapsible steering column has an upper steering shaft, an intermediate steering shaft connected to the upper steering shaft by a universal joint and a jacket housing that moves forward during steering column collapse and envelopes the universal joint.

BACKGROUND OF THE INVENTION

Vehicle steering columns that collapse during a collision are employed on many land vehicles manufactured today. These collapsible steering columns have an energy absorption device that limits the rate of collapse and reduces the maximum force applied to a vehicle driver during the collapse.

The force applied to the vehicle driver is limited by stopping the driver and the steering wheel at a slower rate than the vehicle passenger compartment is stopped. The distance the driver can travel relative to the vehicle passenger compartment during a collision is limited by the windshield, the instrument panel and other vehicle components.

Steering columns, that are currently manufactured, have an upper steering column shaft mounted in a steering column jacket assembly that collapses a distance substantially equal to the total steering column collapse distance. This results in a steering column jacket assembly that is relatively long. A long steering column jacket assembly reduces the space between the driver and the vehicle firewall that is available for other vehicle components. It is frequently necessary to move some vehicle components forward into the engine compartment to accommodate the length of the steering column jacket assembly. Engine compartments of many current vehicles are too crowded with vehicle components making vehicle maintenance difficult and expensive. Engine compartments are hot and dirty. The dirt includes abrasive materials and undesirable gasses. This combination increases maintenance requirements and reduces the life of some vehicle components.

The lack of available space in some vehicles may make it necessary to reduce the available travel distance between the steering wheel and the vehicle body to accommodate the steering jacket assembly. Reducing the distance the steering wheel can move relative to the passenger compartment during a collision reduces the protection available.

Vehicle designers strive to provide the maximum protection for vehicle occupants. They are constrained by manufacturing costs, vehicle operating costs and functional considerations.

SUMMARY OF THE INVENTION

The collapsible vehicle steering column includes a steering column jacket housing. An upper shaft assembly having a variable length is journaled in the steering column jacket housing. An intermediate steering shaft with a universal joint connects the intermediate steering shaft to the upper shaft assembly. Both the intermediate steering shaft and the upper shaft assembly control forward movement of the steering column jacket housing during a collision.

BRIEF DESCRIPTION OF THE DRAWINGS

Presently preferred embodiments of the invention are disclosed in the following description and in the accompanying drawings, wherein.

DETAILED DESCRIPTION OF THE PREFERRED EMBODIMENT

Figure 1:
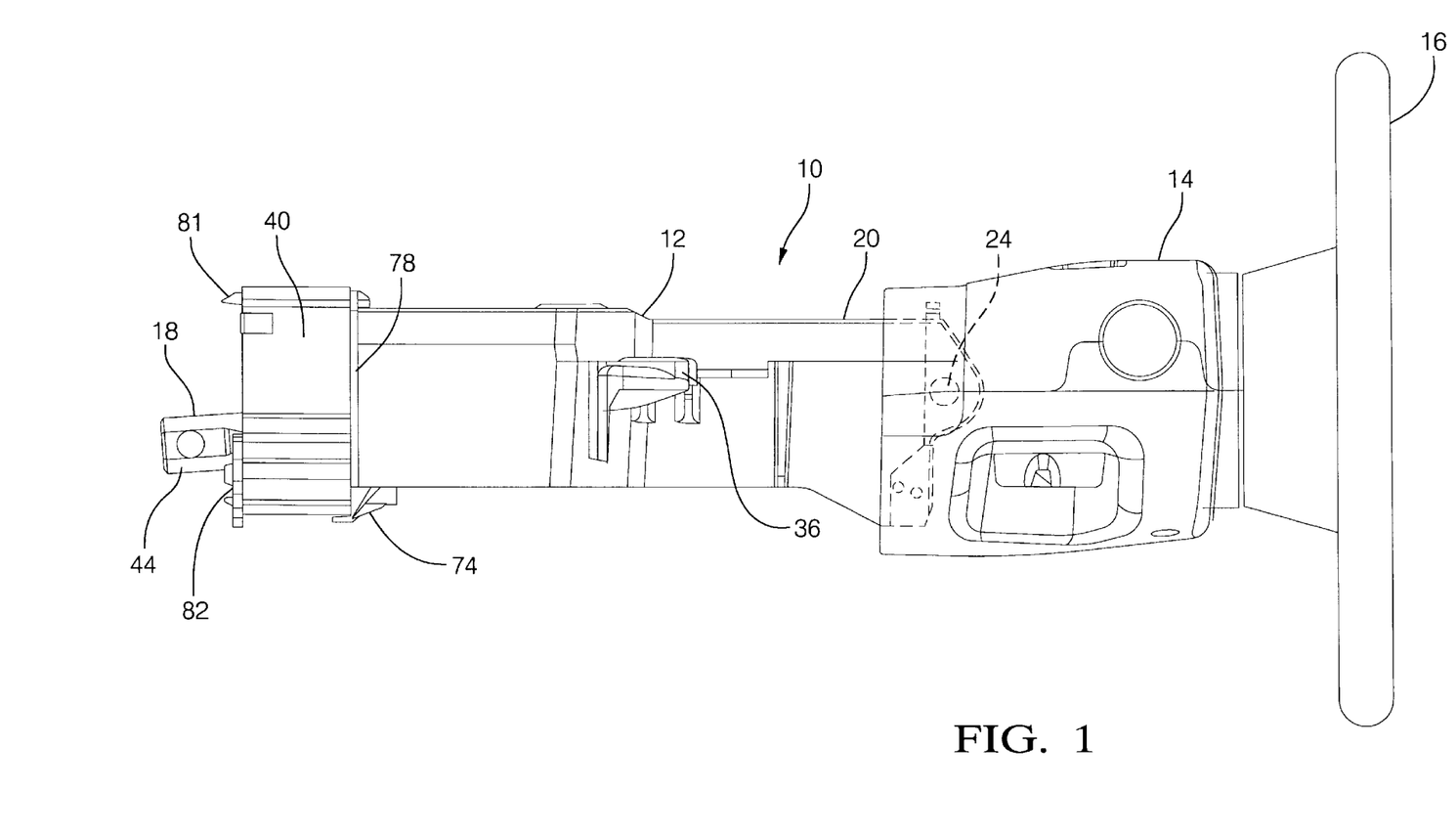
FIG. 1 is a side elevational view of the steering column without the intermediate shaft.
Figure 2:
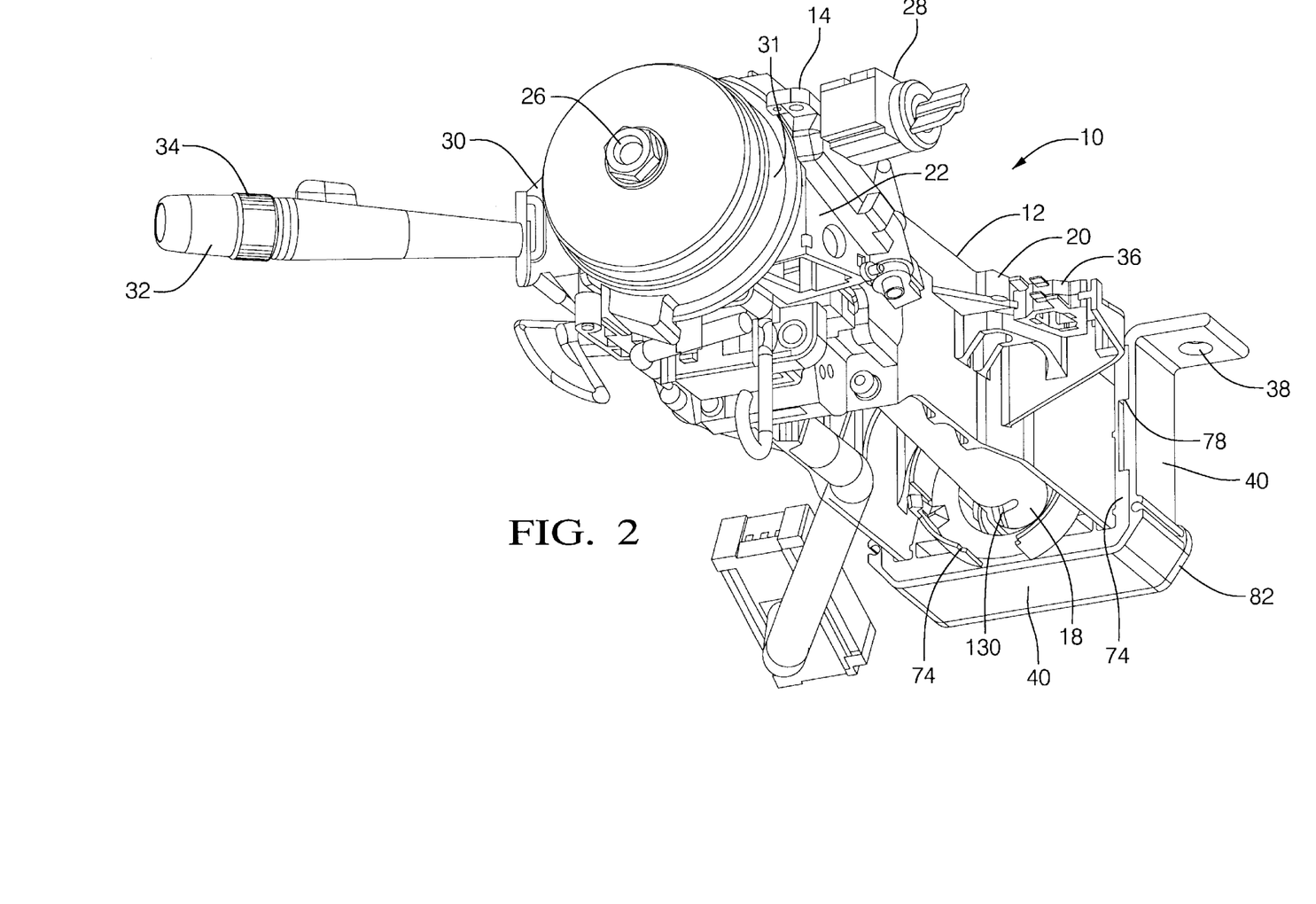
FIG. 2 is a perspective view of the right side and the bottom of the steering column without a steering wheel and covers.

The steering column assembly 10, as shown in FIG. 1, has a jacket assembly 12, a tilt assembly 14, a steering wheel 16 and an upper shaft assembly 18. The tilt assembly 14 includes a tilt housing 22 that is pivotally attached to the jacket housing 20 by two tilt pins 24 shown in FIG. 3. A steering wheel shaft 26 is journaled in the tilt housing 22. An ignition switch 28, a turn signal switch 30 controlled by a turn signal lever 32, an accessory control switch 31 and a windshield wiper controller 34 are attached to the tilt housing 22.

The jacket housing 20 is attached to a vehicle body by bolts that pass through two steering column support capsules 36 and by bolts that pass through two bores 38 through a lower jacket support bracket 40 and clamp the support capsules and the support bracket to the body frame. The jacket support bracket 40 is fixed to the body frame. The column support capsules 36 are also fixed to the body frame. However the support capsules 36 separate from the jacket housing 20 in response to a predetermined force urging the steering wheel 16 forward.

Figure 3:
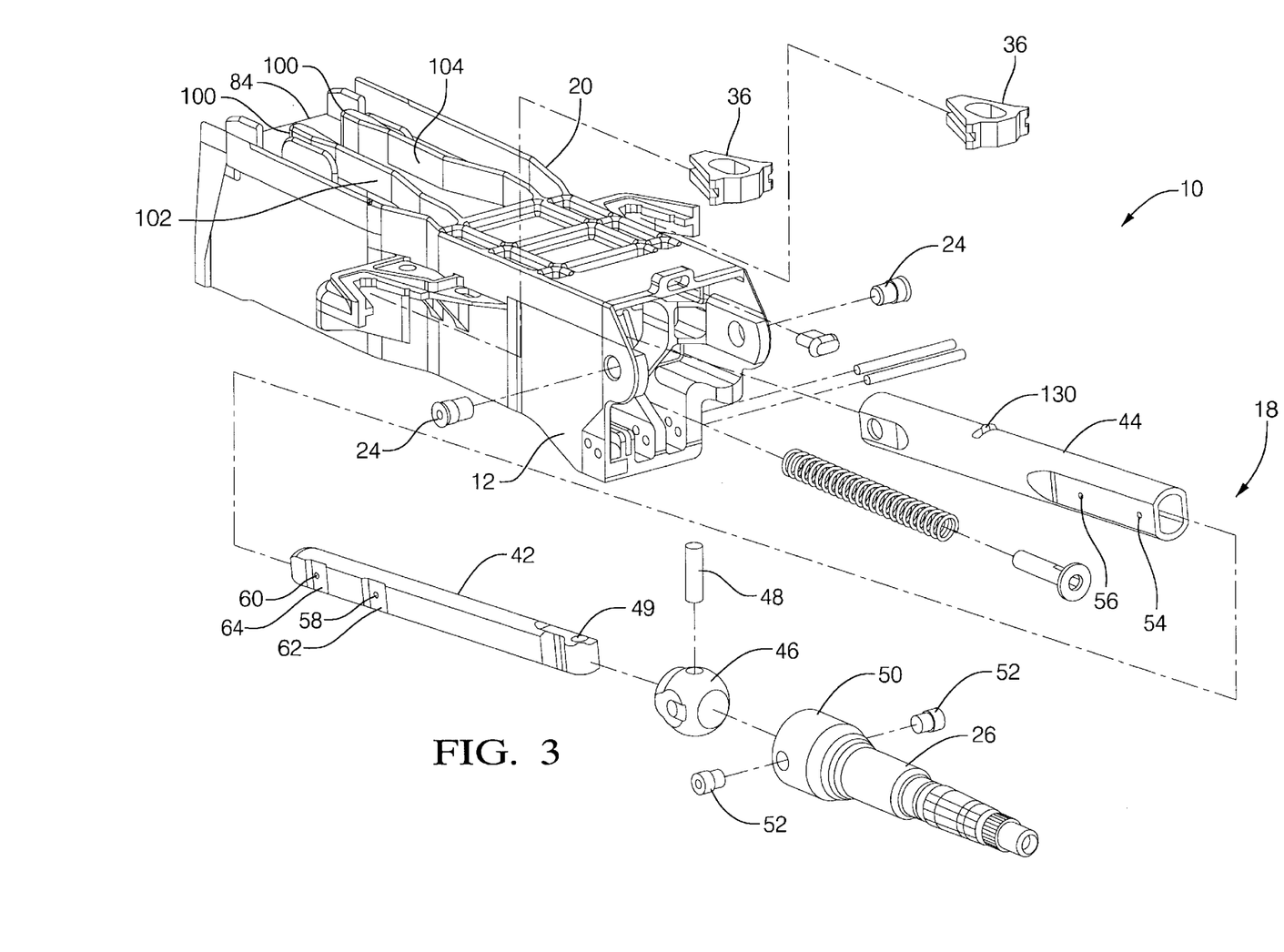
FIG. 3 is an expanded perspective view of the upper end of the steering column and the upper steering shaft assembly.

The upper shaft assembly 18 includes a solid shaft 42 and a tubular shaft 44 that telescopically receives the solid shaft. One end of the solid shaft 42 is pivotally attached to a spherical member 46 by a pin 48 that passes through a bore 49 in the solid shaft. The spherical member 46 is received in a cup member 50 of the steering wheel shaft 26 and pivotally retained by two pivot pins 52. The pins 48 and 52 and the spherical member 46 form a universal joint that supports one end of the upper shaft assembly 18 and transmits torque from the steering wheel 16. A plastic material is injected into openings 54 and 56, and openings 58 and 60 and fills recesses 62 and 64. The plastic material is cured and forms pins 66 and 68 that axially fix the tubular shaft 44 relative to the solid shaft 42.

Figure 4:
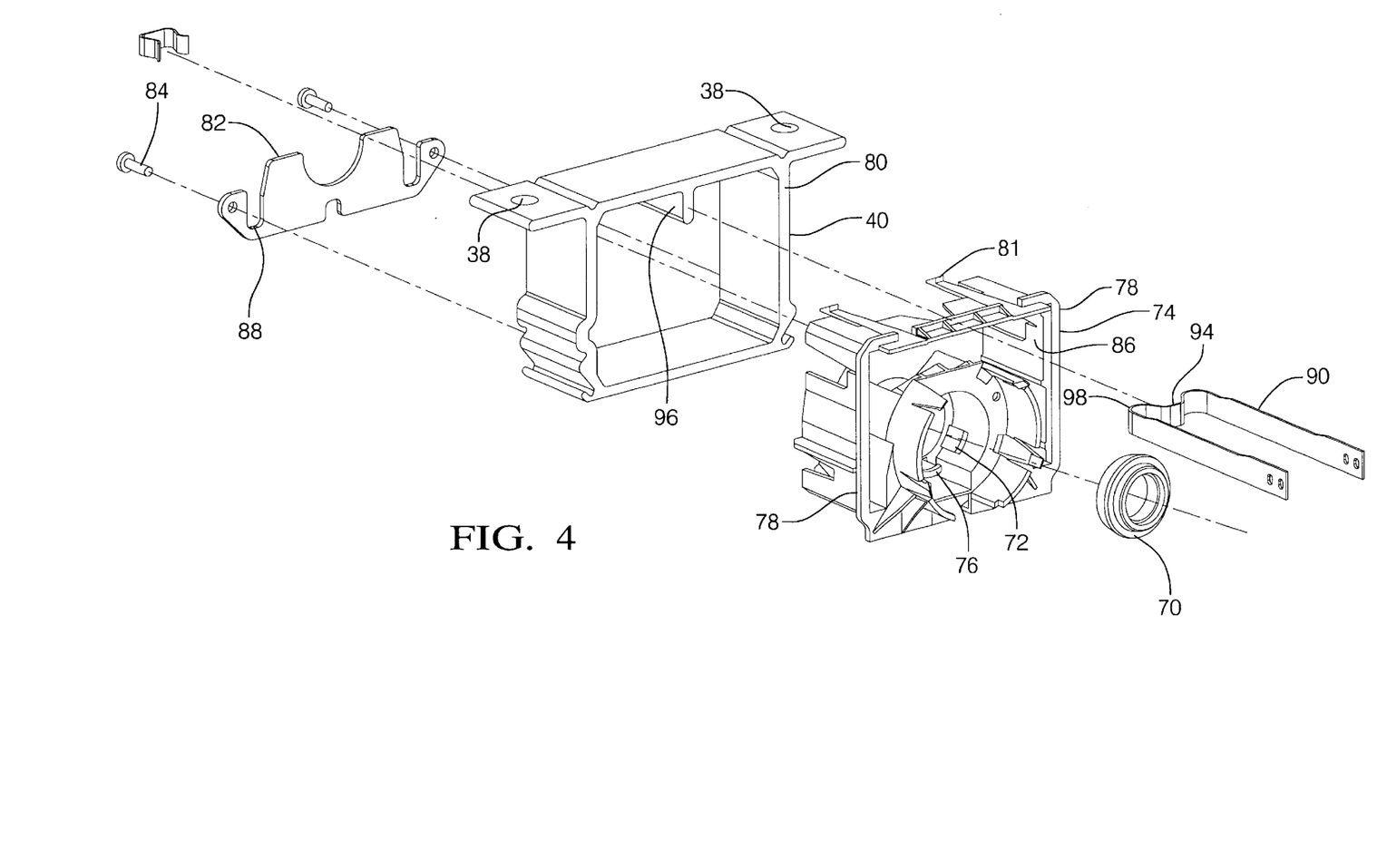
FIG. 4 is an expanded perspective view of the lower end of the steering column without the intermediate shaft.
Figure 5:
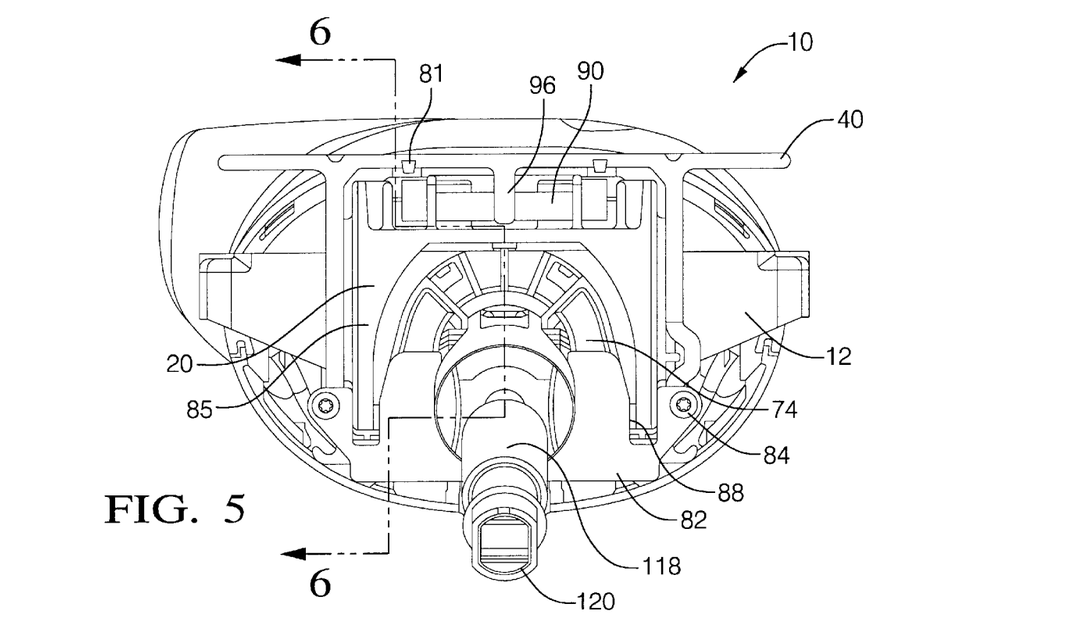
FIG. 5 is an elevational view of the lower end of the steering column looking rearward.
Figure 6:
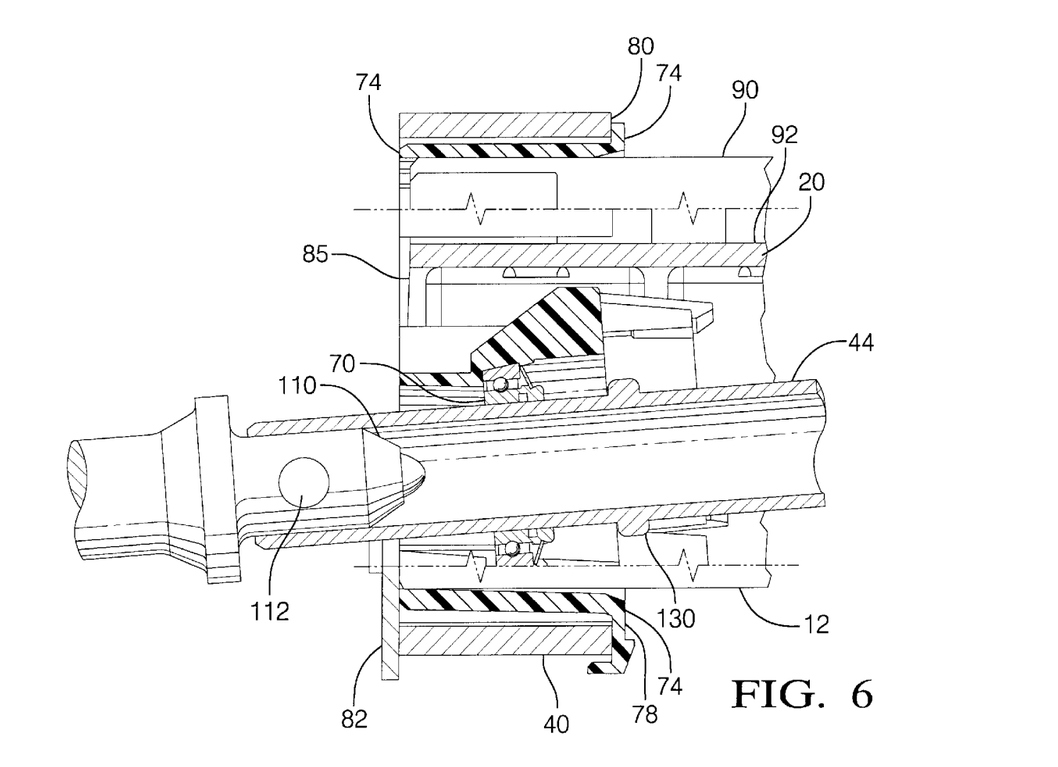
FIG. 6 is an enlarged sectional view taken along line 6—6 in FIG. 5.

The tubular shaft 44 is supported by a bearing 70. The bearing 70 is held in a bearing bore 72 in an adapter 74 by bearing retainers 76. The adapter 74 is a molded plastic member that is inserted into the lower jacket support bracket 40. Flanges 78 contact a rear surface 80 on the support bracket 40 to limit forward movement of the adapter 74. Three hook members 81 engage the forward side of the support bracket 40 to retain the adapter 74 in the bracket. A metal reinforcing plate 82 is connected to a forward side of the lower part of the support bracket 40 by mechanical fasteners 84 to reinforce the adapter 74 in the event of a collision. A forward end 85 of the jacket housing 20 is telescopically received in a passage 86 through the adapter 74. Slots 88 in the reinforcing plate 82 permit the passage of the jacket housing 20.

Figure 7:
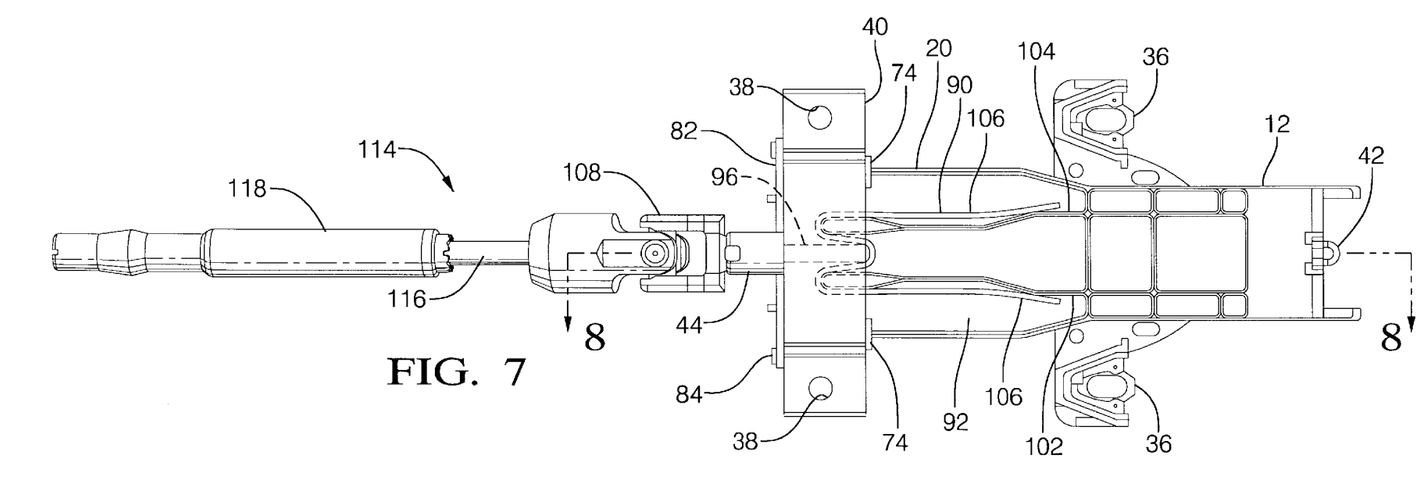
FIG. 7 is a plan view of the steering column assembly and the intermediate shaft prior to collapse.

An energy absorption strap 90 sits on a top surface 92 of the jacket housing 20 as shown in FIG. 7. A center portion 94 of the strap 90 contacts a vertical bar 96 on the support bracket 40. Forward bights 98 of the energy absorption strap 90 contact the forward ends 100 of ribs 102 and 104 extending upward from the top surface 92 of the jacket housing 20. In the event of a collision the forward ends 100 on the jacket housing 20 move forward. The vertical bar 96 on the support bracket 40 holds the center portion 94 of the strap 90. This results in the long legs 106 being deformed into bights 98 and then straightened. Bending and straightening of the legs 106 absorbs energy and slows the deceleration of a person behind the steering wheel 16.

An intermediate steering shaft 114 has a universal joint 108 with a shank 110 that is received in the tubular shaft 44 of the upper shaft assembly 18. A bolt 112 retains the shank 110 in the tubular shaft 44. The intermediate steering shaft 114 also has a solid shaft portion 116 connected to the universal joint 108 and received in a tube 118. The lower end 120 of the intermediate shaft 114 is connectable to a universal joint and a steering assembly (not shown). The tube 118 permits limited axial movement of the shaft portion 116 relative to the tube while transmitting torque from the steering wheel 116 to steered vehicle wheels. The solid shaft portion 116 is connected to the universal joint 108 through a cylinder 122 that houses a vibration damper. Vibration dampers dampen vibrations that result from tires rolling on road surfaces and either isulate the steering wheel 16 from these vibrations or substantially reduces such vibrations.

Figure 8:
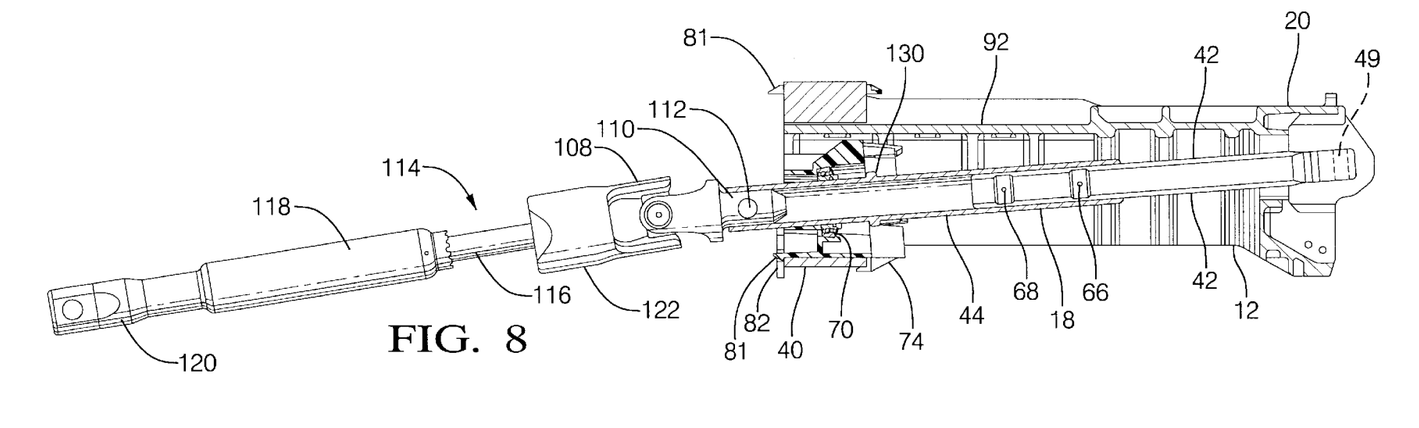
FIG. 8 is a sectional view taken along line 8—8 in FIG. 7.

During a collision involving a vehicle equipped with the steering column assembly 10 described above, the steering wheel 16, the jacket housing 20, the upper shaft assembly 18, the universal joint 108 and the shaft portion 116 of the intermediate shaft 114 will move forward relative to the lower jacket support bracket 40 from the position shown in FIGS. 7 and 8. The bearing 70 will remain stationary with the lower support bracket 40 and the adapter 74. Forward movement of the jacket housing 20 is resisted by the energy absorption strap 90, friction between parts moving relative to each other and the connections between the steering column support capsules 36 and the jacket housing. The connections between the column support capsules 36 and the jacket housing 20 will fracture during the initial movement of the jacket housing 20.

Figure 9:
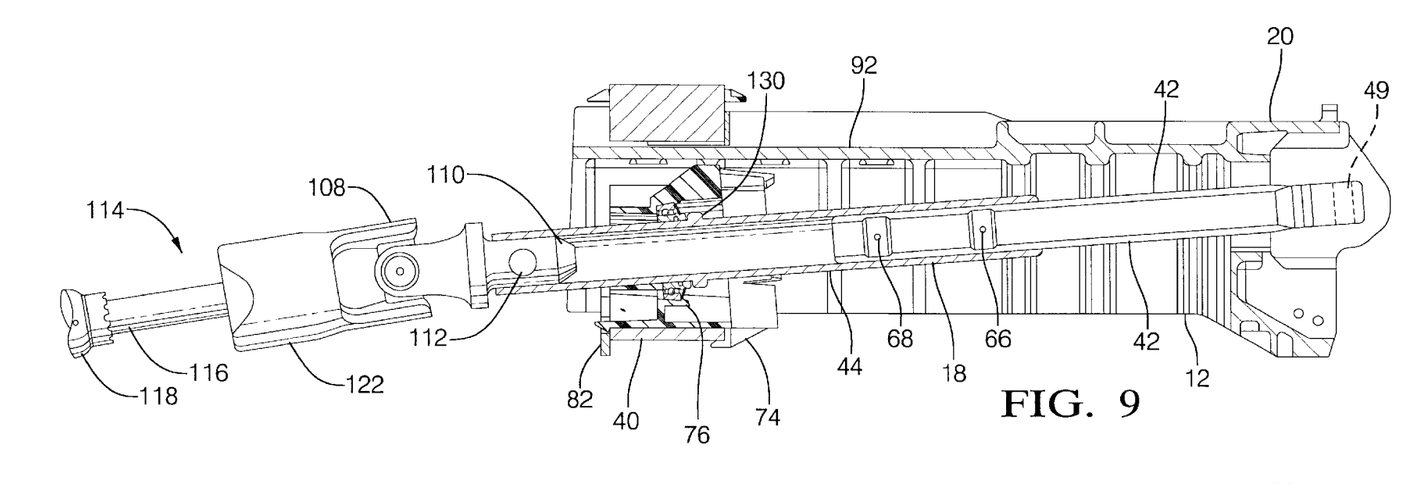
FIG. 9 is a sectional view, similar to FIG. 8, at the end of the first collapse stage.

Forward movement of the jacket housing 20, the upper shaft assembly 18 and the universal joint 108 of the intermediate shaft 114 continues until tabs 130 on the tubular shaft 44 of the upper shaft assembly 18 contacts the bearing 70 as shown in FIG. 9. Contact between the tabs 130 and the bearing 70 will stop forward movement of the tubular shaft 44 of the upper shaft assembly 18, and the portions of the intermediate shaft 114 that were moving forward.

Continued force on the steering wheel 16, if of sufficient magnitude, will sever the pins 66 and 68 that axially fix the solid shaft 42 relative to the tubular shaft 44. After the pins 66 and 68 are severed, the solid shaft 42 will move relative to the tubular shaft 44 and the length of the upper steering shaft 18 will decrease. During this stage, forward movement of the steering wheel 16 will be resisted by the energy absorption strap 90 and friction between the shaft 42 and the tube 44 as well as friction between the jacket housing 20 and the adapter 74.

Figure 10:
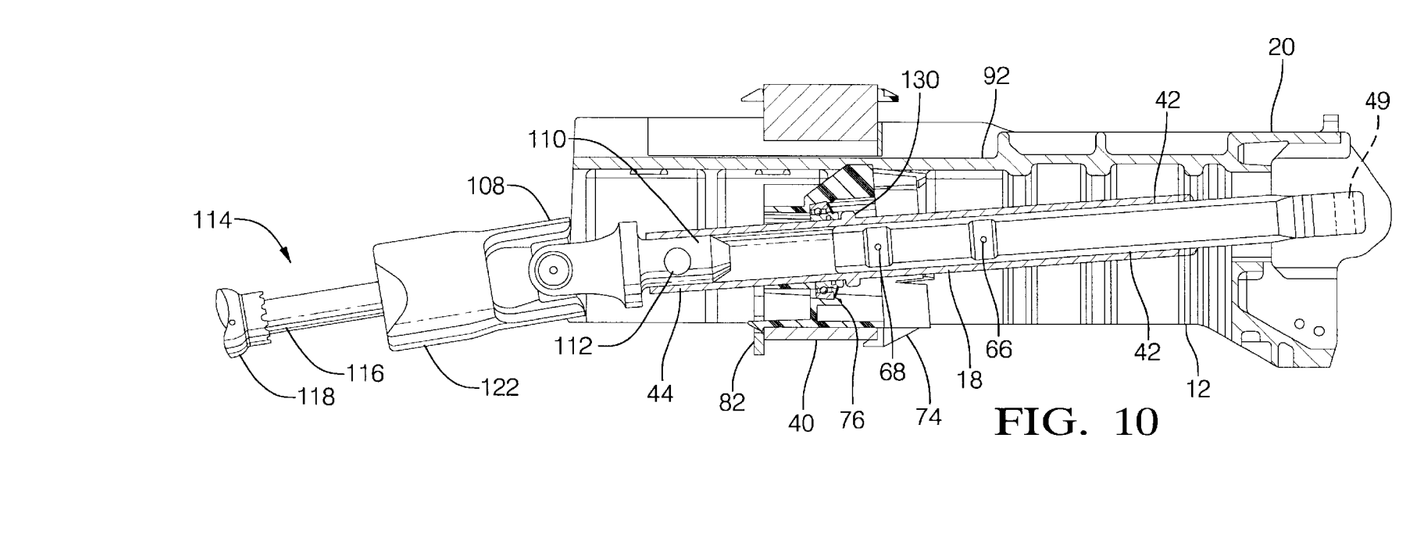
FIG. 10 is a sectional view, similar to FIGS. 8 and 9 with the steering column fully collapsed.

Continued forward force on the steering wheel 116 will move the jacket housing 20 forward. The jacket housing 20 can move forward until the universal joint 108 on an upper end of the intermediate steering shaft 114 is enveloped by the jacket housing 20 as shown in FIG. 10.

The positions of the solid shaft 42 and the tubular shaft 44 of the upper shaft assembly 18 could be reversed if desired. The construction of the intermediate steering shaft 114 could also be modified substantially. The intermediate steering shaft 114 merely has to have a universal joint in its connection to the upper shaft assembly 18 and a variable length.

The disclosed embodiments are representative of presently preferred forms of the invention, but are intended to be illustrative rather than definitive thereof. The invention is defined in the claims.

What is claimed is:

1. A collapsible vehicle steering column comprising:
   a steering column jacket housing with a fixed length;
   an upper shaft assembly having a variable length and journaled in said steering column jacket housing;
   an intermediate steering shaft, having a variable length, with a universal joint connecting the intermediate steering shaft to the upper shaft assembly;
   wherein both the intermediate steering shaft and the upper shaft assembly facilitate forward movement of said steering column jacket housing during a collision; and
   wherein said steering column jacket housing is shiftable from a position to the rear of the universal joint to a position in which said steering column jacket housing envelopes the universal joint.

2. A collapsible vehicle steering column as set forth in claim 1 wherein the upper shaft assembly includes a solid shaft and a tubular shaft that telescopically receives the solid shaft; and
   wherein the solid shaft slides further into the tubular shaft as said steering column jacket assembly envelopes the universal joint.

3. A collapsible vehicle steering column as set forth in claim 1 wherein the upper shaft assembly includes at least one pin that is severed during collapse of the upper shaft assembly.

4. A collapsible vehicle steering column as set forth in claim 1 wherein the intermediate steering shaft includes an intermediate shaft portion that is telescopically received in an intermediate tube.

5. A collapsible vehicle steering column as set forth in claim 4 wherein the intermediate steering shaft collapses prior to collapse of the upper shaft assembly during a collision.

6. A collapsible steering column comprising:
   a jacket assembly with a fixed length slideably supported by a jacket support bracket and supported by at least one severable steering column support capsule;

a steering wheel and a steering wheel shaft journaled in a housing connected to an upper end of said steering column jacket housing;

a bearing supported by the jacket support bracket;

an upper steering shaft connected to the steering wheel shaft and the steering wheel and slideably supported by said bearing and the jacket support bracket and including a solid upper shaft that is telescopically received in a tubular upper shaft;

an intermediate steering shaft with an intermediate solid shaft, an intermediate tubular shaft that telescopically receives the intermediate solid shaft, and a universal joint interconnecting the upper steering shaft to the intermediate steering shaft;

a surface on the upper steering shaft that is spaced from the bearing prior to collapse of said collapsible steering column and that limits axial movement of the upper steering shaft relative to the bearing and the jacket support bracket during collapse of said collapsible steering column; and wherein the intermediate steering shaft and the upper steering shaft both decrease in length and permit the jacket assembly to move forward relative to the jacket support bracket during collapse of said collapsible steering column.

7. A collapsible steering column as set forth in claim 6 wherein the surface on the upper steering shaft is on at least one tab on the upper steering shaft that contacts the bearing to limit a decrease in the length of the intermediate steering shaft.

8. A collapsible steering column as set forth in claim 6 wherein the upper steering shaft includes at least one pin that is severed to permit collapse of the upper steering shaft.

9. A collapsible vehicle steering column as set forth in claim 6 wherein the universal joint is enveloped by said jacket assembly in response to collapse of the upper steering shaft.

10. A collapsible vehicle steering column as set forth in claim 6 wherein the intermediate steering shaft collapses prior to collapse of the upper steering shaft.

11. A collapsible vehicle steering column method of operation comprising:

severing at least one steering column support capsule from a jacket housing in response to a force applied to a steering wheel;

moving the jacket housing and an upper steering shaft assembly forward relative to a jacket support and collapsing an intermediate steering shaft following separation of the at least one steering column support capsule from the jacket housing;

stopping collapse of the intermediate steering shaft upon contact between a bearing supported by the jacket support and a tab on the upper steering shaft assembly; and collapsing the upper steering shaft assembly following collapse of the intermediate steering shaft.

12. A collapsible vehicle steering column method of operation as set forth in claim 11 including:

absorbing energy by an energy absorption device during collapse of the intermediate steering shaft; and absorbing energy by the energy absorption device during collapse of the upper steering shaft assembly and following collapse of the intermediate steering shaft.

13. A collapsible vehicle steering column method of operation as set forth in claim 11 including:

enveloping a universal joint, connecting the upper steering shaft assembly to the intermediate steering shaft, while collapsing the upper steering shaft assembly.

* * * * *